United States Patent
Lee (10) Patent No.: US 8,863,294 B2
(45) Date of Patent: Oct. 14, 2014

(54) DIGITAL CONTENT MANAGEMENT METHOD AND APPARATUS FOR MOBILE TERMINAL

(75) Inventor: Hyung Chul Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1195 days.

(21) Appl. No.: 12/590,059

(22) Filed: Nov. 2, 2009

(65) Prior Publication Data

US 2010/0049989 A1 Feb. 25, 2010

(30) Foreign Application Priority Data

Nov. 5, 2008 (KR) .................. 10-2008-0109574

(51) Int. Cl.
G06F 21/00 (2013.01)
G06F 21/10 (2013.01)

(52) U.S. Cl.
CPC .................. G06F 21/105 (2013.01)
USPC .......................................................... 726/26

(58) Field of Classification Search
None
See application file for complete search history.

(56) References Cited

U.S. PATENT DOCUMENTS

| 7,089,594 B2* | 8/2006 | Lal et al. ............... 726/31 |
| 2006/0107046 A1* | 5/2006 | Raley et al. ............ 713/168 |
| 2008/0256645 A1* | 10/2008 | Choi et al. ............. 726/27 |
| 2008/0289044 A1* | 11/2008 | Choi ...................... 726/26 |

* cited by examiner

Primary Examiner — Minh Dinh (57) ABSTRACT

A mobile terminal includes an apparatus configured to perform content management method. When a DRM content that is not playable owing to license expiration is found during the content playback mode, the non-playable DRM content can be removed, moved to a pre-specified folder, or license-renewed according to settings. The content management method includes: playing back a content selected from a given content list during a content playback mode; finding, during the content playback mode, an expired DRM content that is not playable owing to license expiration; determining, when an expired DRM content is found, a handling option for the expired DRM content; and performing one of deleting the expired DRM content, moving the expired DRM content, and renewing the license associated with the expired DRM content, according to the determined handling option.

21 Claims, 9 Drawing Sheets

DIGITAL CONTENT MANAGEMENT METHOD AND APPARATUS FOR MOBILE TERMINAL

CROSS-REFERENCE TO RELATED APPLICATION(S) AND CLAIM OF PRIORITY

The present application is related to and claims priority to an application entitled "DIGITAL CONTENT MANAGEMENT METHOD AND APPARATUS FOR MOBILE TERMINAL" filed in the Korean Intellectual Property Office on Nov. 5, 2008 and assigned Serial No. 10-2008-0109574, the contents of which are incorporated herein by reference.

TECHNICAL FIELD OF THE INVENTION

The present invention relates generally to a method and apparatus for digital content management and, more particularly, to a method and apparatus that can efficiently manage Digital Rights Management (DRM) contents in a mobile terminal.

BACKGROUND OF THE INVENTION

Digital rights management (DRM) has been developed to prevent unauthorized duplication or redistribution of paid contents. DRM applies cryptographic techniques to various contents including documents, MP3 files, ring tones, moving images and games in order to protect the rights of copyright holders. DRM aims to support the full life cycle of digital contents including creation, distribution, usage and retirement.

A DRM-protected content (or DRM content) is encrypted, and only an authorized user can decrypt and use the DRM content. That is, even when a DRM content is duplicated, a user without a valid license cannot use the DRM content. Hence, DRM can prevent illegal duplication of contents.

A license associated with a digital content is issued by a DRM server and sold to a user of the digital content. A license can be stored separately in a user device (a mobile terminal and the like), and can place restrictions on the use of the associated content. In general, licenses can place restrictions in the form of play counts, intervals, timed counts, and accumulations.

A license includes information for restricting the use of an associated DRM content. For example, when a user buys an MP3 file and associated license allowing ten (10) plays, the user can play the MP3 file ten (10) times in total. In this case, whenever the MP3 file is played back, the count is decremented by "1". When the count reaches zero with repeated playback, the MP3 file can no longer be played back. To continue playback of the MP3 file, the user has to purchase another license for the MP3 file.

In a normal case, when a playback request is issued for a content whose license has expired in a mobile terminal, an alert notifying inability to play is displayed or the cursor or pointer is automatically moved to the next content.

However, DRM contents can coexist with regular non-DRM contents in a mobile terminal. In a typical content list including both DRM contents and non-DRM contents, the user may have difficulty in distinguishing DRM contents from non-DRM contents. This problem tends to worsen as the number of contents increases.

Even in a content list including only DRM contents, the user may have difficulty in distinguishing playable DRM contents from those DRM contents not playable owing to expiration of licenses. That is, existing content listing schemes may fail to distinguish DRM contents having valid licenses from those DRM contents having expired licenses. This may cause inconvenience to the user with regard to management of digital contents.

When the content license expires, the user may decide to purchase another license for the continued use of the content, or may decide not to use the content further and desire to discard the content. In this case, existing content listing schemes may fail to provide information useful for the purchase or discard decision. That is, the user may have to make the purchase or discard decision from memory.

In the case when a content list is composed of contents whose licenses have expired, when the user attempts to play a particular content, the cursor or pointer may simply continue to move to the next content without playback of any content. The user may misunderstand this situation as an error due to abnormal contents or as a failure of the mobile terminal.

Accordingly, it is necessary to provide a means that enables the user to manage a mixture of DRM contents and regular non-DRM contents.

SUMMARY OF THE INVENTION

To address the above-discussed deficiencies of the prior art, it is a primary object to provide a method and apparatus that enable a plurality of digital contents stored in a mobile terminal to be managed in a more intuitive and convenient manner.

The present invention also provides a user interface for a mobile terminal that can display content lists and stored contents in an intuitive manner.

The present invention further provides a content management method and apparatus that enable, during a content playback mode, a particular content having an expired license to be separately saved or be removed, and further enable a separately saved content to be removed or be license-updated in a convenient manner.

In accordance with an exemplary embodiment of the present invention, there is provided a content management method for a mobile terminal, including: playing back a content selected from a given content list during a content playback mode; finding, during the content playback mode, an expired DRM content that is not playable owing to license expiration; determining, when an expired DRM content is found, a handling option for the expired DRM content; and performing one of deleting the expired DRM content, moving the expired DRM content, and renewing the license associated with the expired DRM content, according to the determined handling option.

In accordance with another exemplary embodiment of the present invention, there is provided a mobile terminal, including: an input unit that can receive signals for playback mode transitioning, playback command, selection of one or more contents from a displayed content list, and for movement and deletion of a selected content and license renewal therefore; a storage unit separately storing various contents according to their types including regular contents, DRM contents, playable DRM contents and expired DRM contents, storing licenses associated with DRM contents, and storing settings for handling expired DRM contents and license renewal; and a control unit configured to determine, when an expired DRM content is found during a content playback mode, a handling option for the expired DRM content, and control an operation to perform one of deleting the expired DRM content, moving the expired DRM content, and renew the license associated with the expired DRM content according to the determined handling option.

In a feature of the present invention, a content management method and apparatus are provided for a mobile terminal. The content management method and apparatus display plural contents according to type (regular contents, DRM contents, playable DRM contents, expired DRM contents, total contents, and others). Hence, the user can rapidly locate a desired content, and identify various contents with ease through an intuitive interface.

The content management method and apparatus enable a DRM content having an expired license to be deleted, moved or license-updated according to the settings. Hence, the user can manage expired DRM contents with ease. As expired DRM contents are managed separately, the user can readily identify an expired DRM content and make a decision as to license renewal or removal thereof.

With respect to an expired content during a content playback mode, the content management method and apparatus can simplify the procedure for license acquisition and shorten the time therefore, enhancing user convenience.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable device.

The present invention relates to a method and apparatus for content management in a mobile terminal. The present invention provides a user interface that enables the user to manage DRM-protected contents in an intuitive and convenient manner, and a content management method and apparatus using the same.

Multiple contents stored in a mobile terminal can be grouped into DRM contents and regular non-DRM contents, and DRM contents can be divided into playable DRM contents and expired DRM contents (not playable owing to license expiration).

Status information regarding licenses of individual contents in a content list is displayed, enabling the user to easily identify a DRM content in the content list containing both regular contents and DRM contents.

It is possible for the user to navigate playable DRM contents and non-playable DRM contents (because of license expiration) separately.

When a DRM content, which is not playable due to license expiration, is detected during a content playback mode, the detected non-playable DRM content can be deleted or moved to a particular folder. Additionally, a procedure for license renewal or repurchase, with respect to a DRM content whose license has expired, can be performed with ease.

Figure 1:
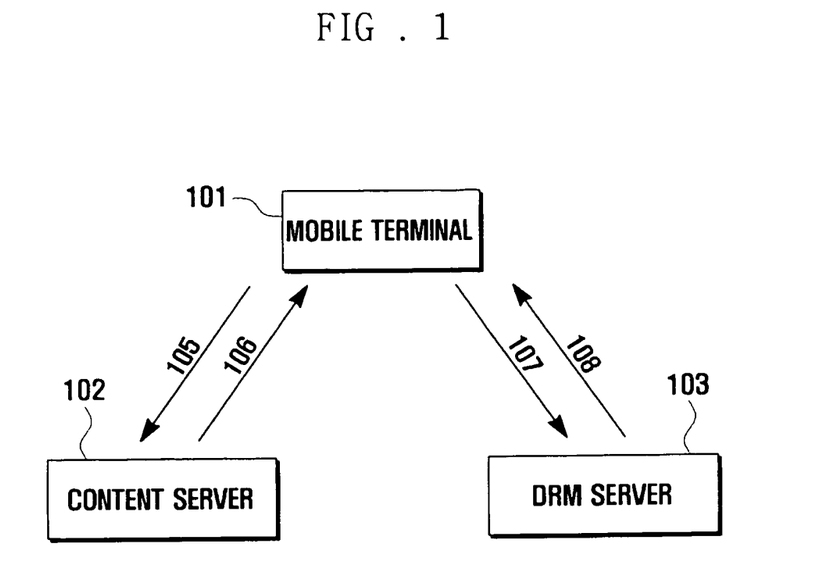
FIG. 1 illustrates a block diagram of a system performing operations for DRM content purchase and license acquisition.

FIG. 1 illustrates a block diagram of a system performing operations for DRM content purchase and license acquisition.

Referring to FIG. 1, in response to a purchase request for a particular content from the user, a mobile terminal 101 connects to a content server 102 managing contents, and sends a purchase request message to the content server 102 in step 105. The content server 102 can be a web server.

In return, the content server 102 sends the requested content to the mobile terminal 101 in step 106. In the description, the delivered content is assumed to be DRM-protected. That is, the content is encrypted with a preset encryption key and encryption scheme, and has attached usage restrictions (such as the number of allowed plays and playable time duration).

Upon reception of the content from the content server 102, the mobile terminal 101 sends a request for a license associated with the content to a DRM server 103 in step 107. The DRM server 103 can be a server managing licenses for DRM contents. A license is a certificate that provides usage rights for an associated content, and contains a decryption key for decrypting the associated content and usage restrictions. The mobile terminal 101 has to acquire a necessary DRM license to play back a DRM content.

The DRM server 103 then verifies whether the user of the mobile terminal 101 is an authorized user for the content, and, if the user is an authorized user, generates a license associated with the content and sends the license to the mobile terminal 101 in step 108. The license can contain a decryption key and usage restrictions for the content.

After reception of the license from the DRM server 103, the mobile terminal 101 can play back the content purchased from the content server 102.

In response to a playback request for the purchased content, the mobile terminal 101 extracts a decryption key and usage restrictions from the associated license, and checks whether the usage status of the content conforms to the usage restrictions (such as the number of plays and playable time duration). If the usage status conforms to the usage restrictions, the mobile terminal 101 decrypts the content using the decryption key and plays back the decrypted content.

Hereinabove, a description is given of a procedure performed by a mobile terminal to purchase a desired DRM content and to acquire an associated license. Next, a method is described that plays back a selected content (such as an MP3 file) in a content list of a particular category (such as music) during a content playback mode. The content list is assumed to be a mixed list that contains one or more regular contents, playable DRM contents, and DRM contents not playable due to license expiration (expired DRM contents).

Figure 2:
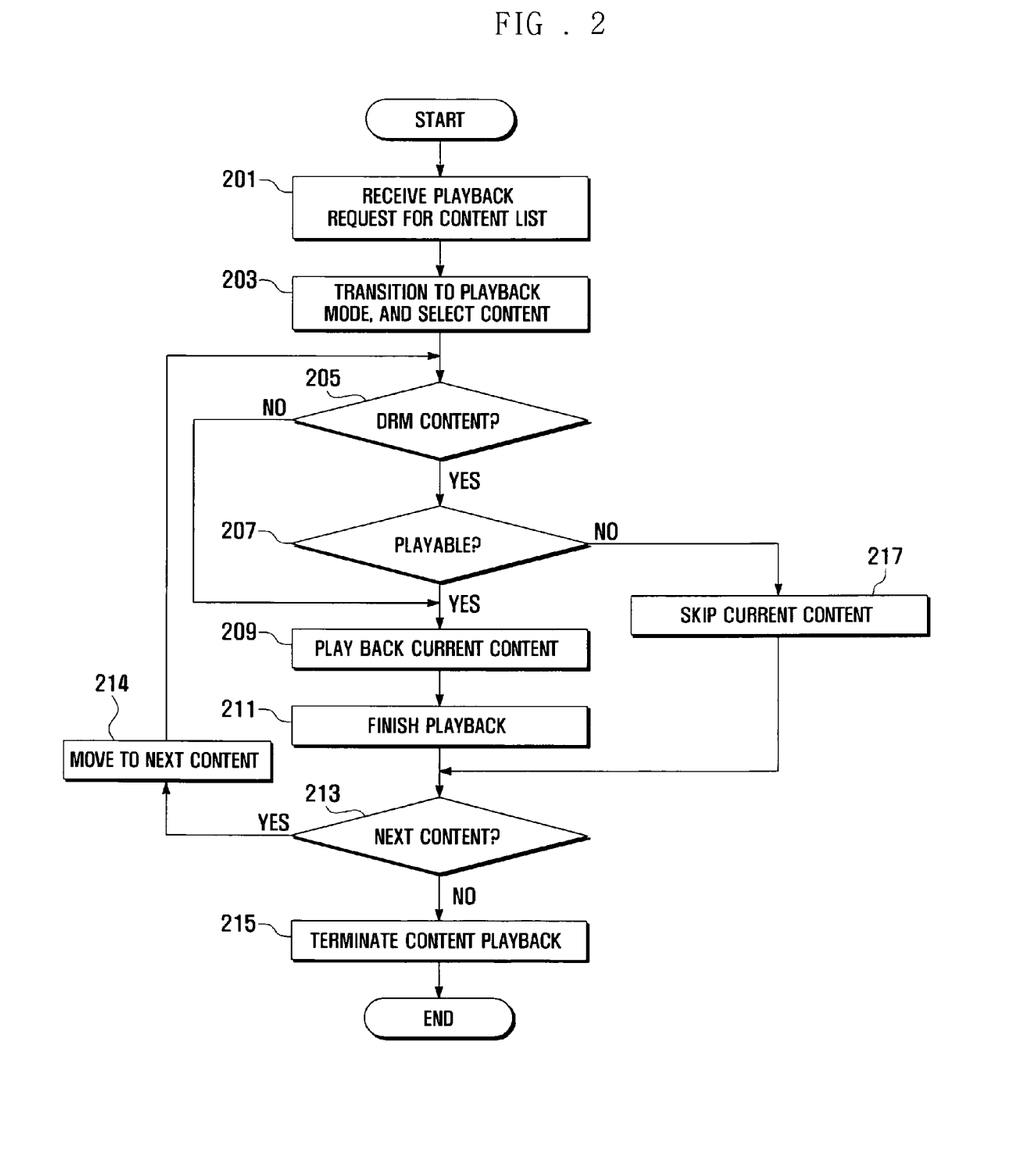
FIG. 2 illustrates a flow chart for a general method for content playback in a content playback mode according to an exemplary embodiment of the present invention.

FIG. 2 illustrates a flow chart for a general method for content playback in a content playback mode.

Referring to FIG. 2, when a playback request for a content list is received from the user (step 201), the mobile terminal transitions to a content playback mode and selects a content from the content list as the current content (step 203). Thereafter, the mobile terminal checks whether the current content is a DRM content (step 205).

If the current content is a regular non-DRM content, the mobile terminal plays back the current content (step 209), and proceeds to step 211. If the current content is a DRM content, the mobile terminal checks whether the current content is playable (step 207). At step 207, the mobile terminal checks whether the current DRM content is playable or non-playable due to license expiration.

If the current content is a playable DRM content, the mobile terminal plays back the current content (step 209). Thereafter, when playback of the current content is completed (step 211), the mobile terminal checks whether a next content is present in the content list (step 213).

If a next content is present in the content list, the mobile terminal selects the next content as the current content (step 214) and returns to step 205 for continued processing. If a next content is not present in the content list, the mobile terminal terminates content playback (step 215), and can display a user interface for the content playback mode or terminate the content playback mode according to settings. In FIG. 2, simple playback is assumed. For repeated playback, step 213 (checking for the next content) can be executed for all contents in the content list, and the content playback mode can be terminated by a user command.

If the current content is a non-playable DRM content at step 207, the mobile terminal skips the current content (step 217) and proceeds to step 213.

As described above, multiple regular contents and multiple DRM contents can coexist together in a content list of a particular category. The individual DRM contents can be playable or non-playable due to license expiration. That is, even when a DRM content becomes non-playable because of license expiration due to repeated playback, the non-playable DRM content can be continuously traversed in the content list while remaining in the same folder.

As a result, during playback of contents in the content playback mode, a non-playable DRM content is repeatedly checked and skipped, and the next content is selected for playback. This can lead to wasted time and causes inconvenience to the user. In the case where the content list only contains expired DRM contents, the mobile terminal can simply repeat checking and skipping without real content playback.

To solve such a problem, the user may have to remove an expired DRM content from the content list or renew the license of an expired DRM content. However, in a situation where the content list contains regular contents, playable DRM contents and expired DRM contents, it may be not easy for the user to remove an expired DRM content or to perform license renewal.

Accordingly, according to an embodiment of the present invention, a scheme is provided that enables more intuitive content management, and that, upon detection of an expired DRM content in a content playback mode, moves the expired DRM content to a pre-specified folder, removes the expired DRM content, or renews the license associated with the expired DRM content according to settings.

Figure 3:
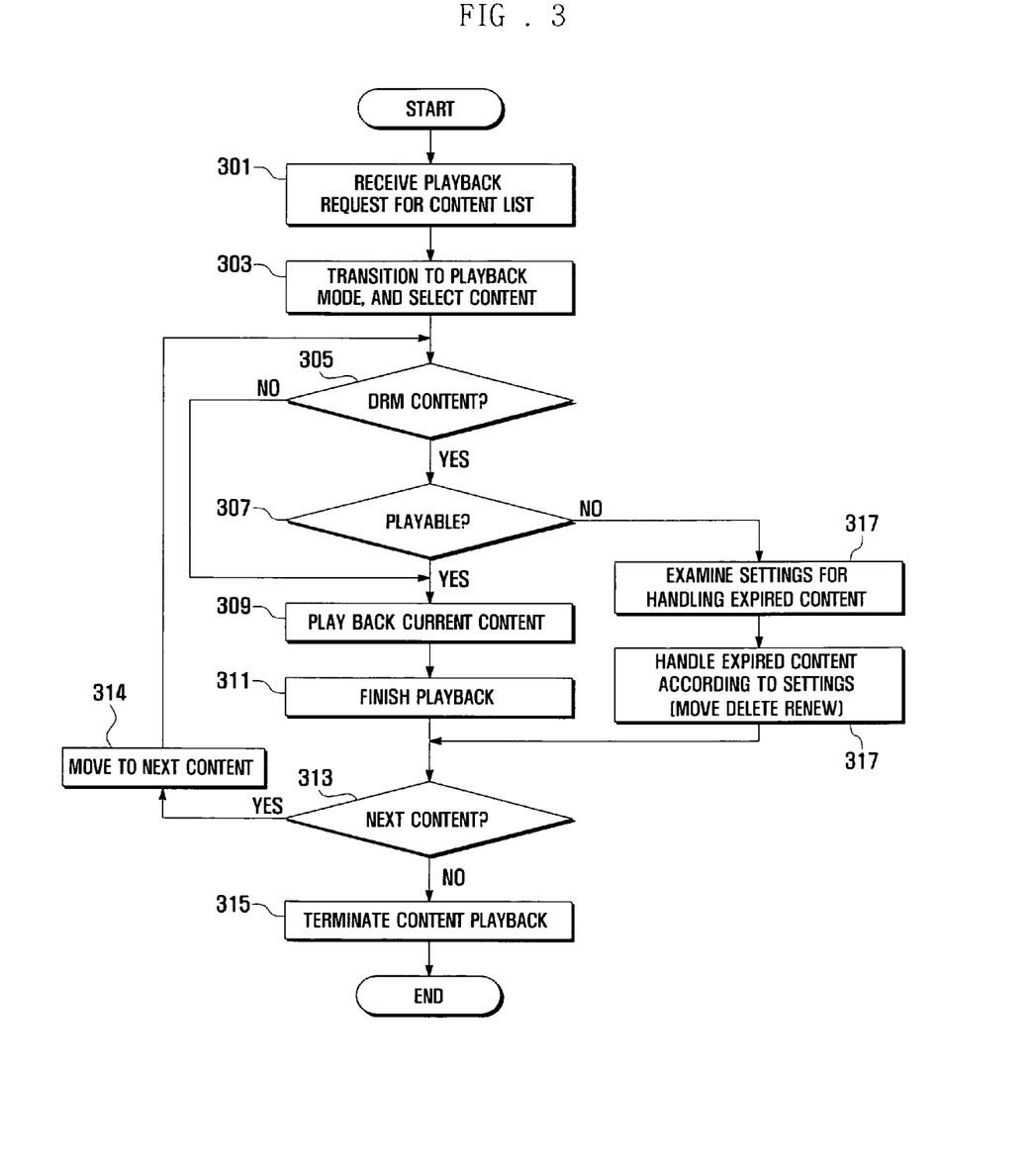
FIG. 3 illustrates a flow chart for a method for content playback in a content playback mode according to another exemplary embodiment of the present invention.

FIG. 3 illustrates a flow chart for a method for content playback in a content playback mode.

Referring to FIG. 3, when a playback request for a content list is received from the user (step 301), the mobile terminal transitions to a content playback mode and selects a content from the content list as the current content (step 303). Thereafter, the mobile terminal checks whether the current content is a DRM content (step 305).

If the current content is a regular non-DRM content, the mobile terminal plays back the current content (step 309), and proceeds to step 311. If the current content is a DRM content, the mobile terminal checks whether the current content is playable (step 307). At step 307, the mobile terminal examines the license associated with the current content and checks whether the current DRM content is playable or non-playable owing to license expiration (expired DRM content).

If the current content is a playable DRM content, the mobile terminal plays back the current content (step 309). Thereafter, when playback of the current content is completed (step 311), the mobile terminal checks whether a next content is present in the content list (step 313).

If a next content is present in the content list, the mobile terminal selects the next content as the current content (step 314) and returns to step 305 for continued processing. If a next content is not present in the content list, the mobile terminal terminates content playback (step 315), and can display a user interface for the content playback mode or terminate the content playback mode according to settings. In FIG. 3, simple playback is assumed. For repeated playback, step 313 (checking for the next content) can be executed for all contents in the content list, and the content playback mode can be terminated by a user command.

If the current content is a non-playable DRM content (expired DRM content) at step 307, the mobile terminal skips playback of the current content and examines the settings for handling an expired DRM content (step 317).

The mobile terminal can handle the expired DRM content according to the settings (step 319). That is, the mobile terminal can move the expired DRM content to a pre-specified folder, remove the expired DRM content, or renew the license associated with the expired DRM content (or renew licenses associated with all expired DRM contents in the content list). These steps are described later in more detail with reference to the drawings.

Figure 4:
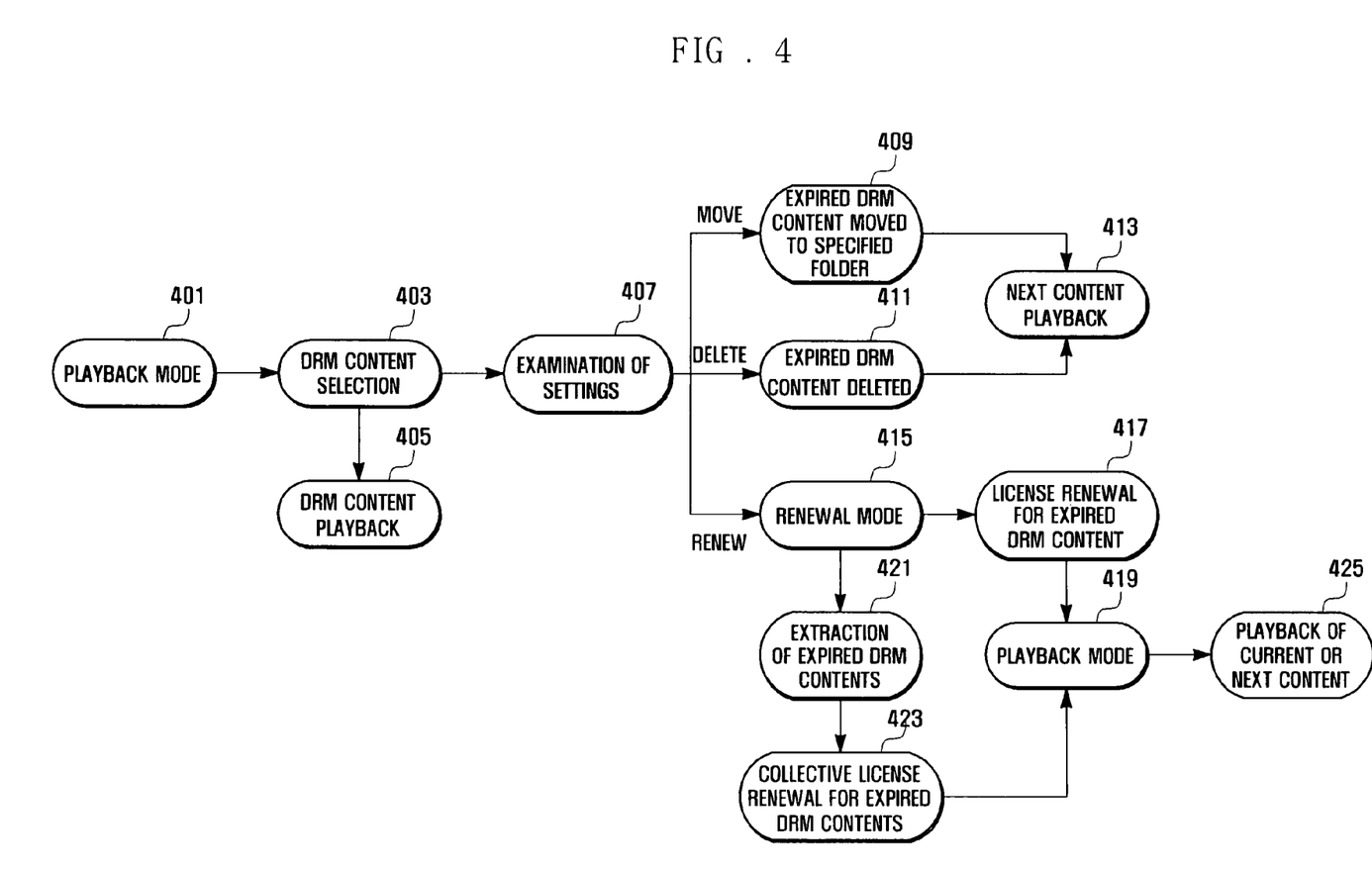
FIG. 4 illustrates a state diagram depicting DRM content management operations in a content playback mode.

FIG. 4 illustrates a state diagram depicting DRM content management operations in the content playback mode.

Referring to FIG. 4, when a playback request for a content list is received from the user in a content playback mode (step 401), the mobile terminal selects a DRM content from the content list as the current content (step 403). The mobile checks whether the current DRM content is playable or non-playable owing to license expiration.

If the current DRM content is playable, the mobile terminal plays back the current content (step 405). If the current DRM content is non-playable, the mobile terminal examines the settings for handling an expired DRM content (step 407).

If the settings indicate a move-to-folder option, the mobile terminal moves the current DRM content to a pre-specified folder (step 409), and proceeds to playback of the next content (step 413). This content movement can be performed silently without display of a notification, or can be notified to the user through a popup window. Although not shown, all expired DRM contents in the content list can be moved simultaneously.

If the settings indicate a removal option, the mobile terminal removes the current DRM content from the content list (step 411), and proceeds to playback of the next content (step 413). This content removal due to license expiration can be performed silently without display of a notification, or can be notified to the user through a popup window with or without obtaining user acceptance. Although not shown, all expired DRM contents in the content list can be removed simultaneously.

If the settings indicate a license renewal option, the mobile terminal transitions to a license renewal mode and performs a license renewal operation for the current DRM content (step 415). License renewal is described later in connection with screen representations.

During the license renewal mode, the mobile terminal examines the license renewal option. License renewal can be performed according to a single renewal option or a collective renewal option. In the single renewal option, when an expired DRM content is found during the content playback mode, license renewal is performed only for the expired DRM content. In the collective renewal option, when an expired DRM content is found during the content playback mode, license renewal is performed for all expired DRM contents in the content list.

If the license renewal option is single renewal, the mobile terminal renews the license associated with the current DRM content (step 417). After license renewal, the mobile terminal transitions to the content playback mode (step 419), and plays back the current DRM content, whose license has been renewed, or the next content (step 425).

If the license renewal option is collective renewal, the mobile terminal examines all contents in the content list and makes a list of expired DRM contents (step 421). The list of expired DRM contents can be displayed to the user.

The mobile terminal renews the licenses associated with the expired DRM contents simultaneously (step 423). After license renewal, the mobile terminal transitions to the content playback mode (step 419), and plays back the current DRM content, whose license has been renewed, or the next content (step 425).

Figure 5:
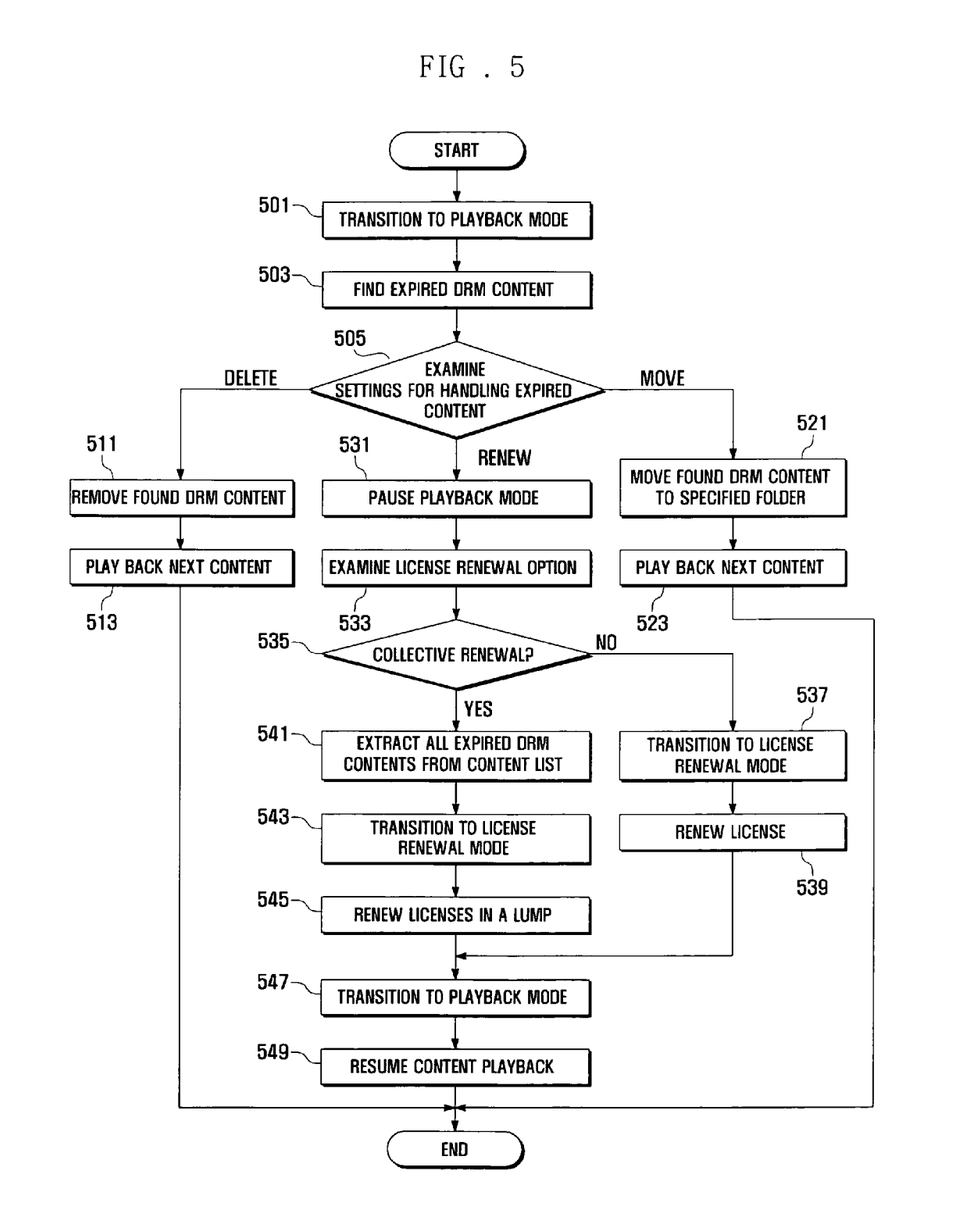
FIG. 5 illustrates a flow chart for a procedure for content management in the method of FIG. 3.

Next, a detailed description is given of a procedure for managing expired DRM contents during a content playback mode in connection with FIG. 5.

FIG. 5 illustrates a flow chart for a procedure for content management in the method of FIG. 3.

Referring to FIG. 5, in response to a playback request for a content list from the user, the mobile terminal transitions to a content playback mode (step 501). When an expired DRM content is found during the content playback mode (step 503), the mobile terminal examines the settings for handling an expired DRM content (step 505).

If the settings indicate a removal option, the mobile terminal removes the expired DRM content from the content list (step 511), and proceeds to playback of the next content (step 513). At step 511, the mobile terminal can remove all expired DRM contents of the content list simultaneously according to user settings.

If the settings indicate a move-to-folder option, the mobile terminal moves the expired DRM content to a pre-specified folder (step 521), and proceeds to playback of the next content (step 523). The mobile terminal can select all expired DRM contents of the content list and move the expired DRM contents to the pre-specified folder simultaneously according to user settings.

If the settings indicate a license renewal option, the mobile terminal pauses the content playback mode (step 531), and examines the license renewal option (step 533).

If the license renewal option is single renewal (step 535), the mobile terminal transitions to a license renewal mode (step 537), and renews the license associated with the expired DRM content (step 539). After license renewal, the mobile terminal transitions to the content playback mode (step 547), and resumes content playback (step 549). At step 549, the content being played back can be the license-renewed DRM content or the next content.

If the license renewal option is collective renewal, the mobile terminal extracts all expired DRM contents from the content list (step 541), and transitions to a license renewal mode (step 543). During the license renewal mode, the mobile terminal renews the licenses associated with all the expired DRM contents simultaneously (step 545). After license renewal, the mobile terminal transitions to the content playback mode (step 547), and resumes content playback (step 549). At step 549, the content being played back can be one of the license-renewed DRM contents (found first as an expired DRM content) or the next content.

Although not shown in FIG. 5, the mobile terminal can move the DRM contents with renewed licenses from an expired DRM folder to a renewed DRM folder as an additional step. In addition, as described herein below, icons can be remapped to indicate status information on the renewed licenses.

Hereinabove, management of expired DRM contents is described. Next, DRM content management is described in connection with FIGS. 6 through 8.

Figure 6:
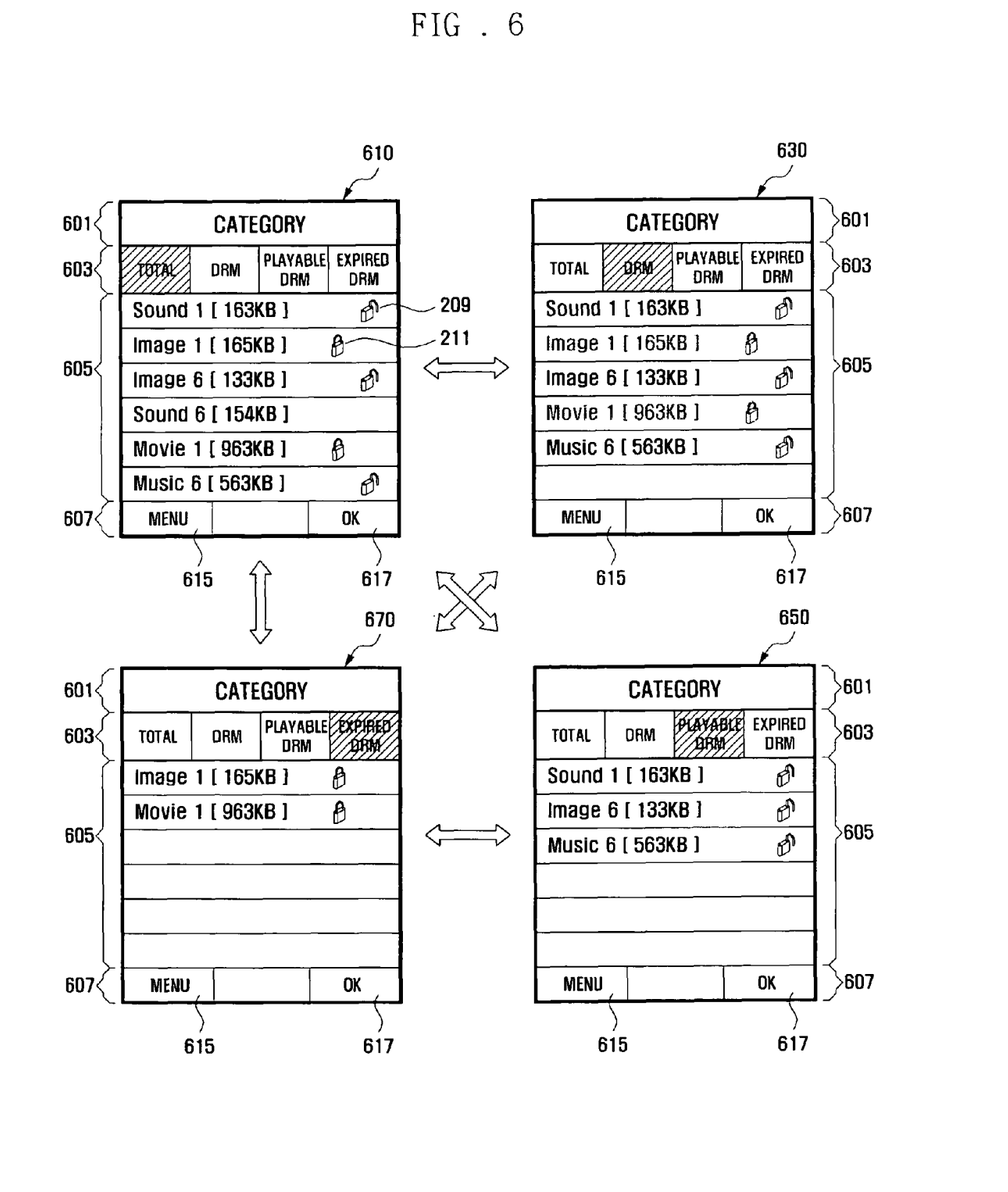
FIG. 6 illustrates representations of screens listing contents according to type.
Figure 7:
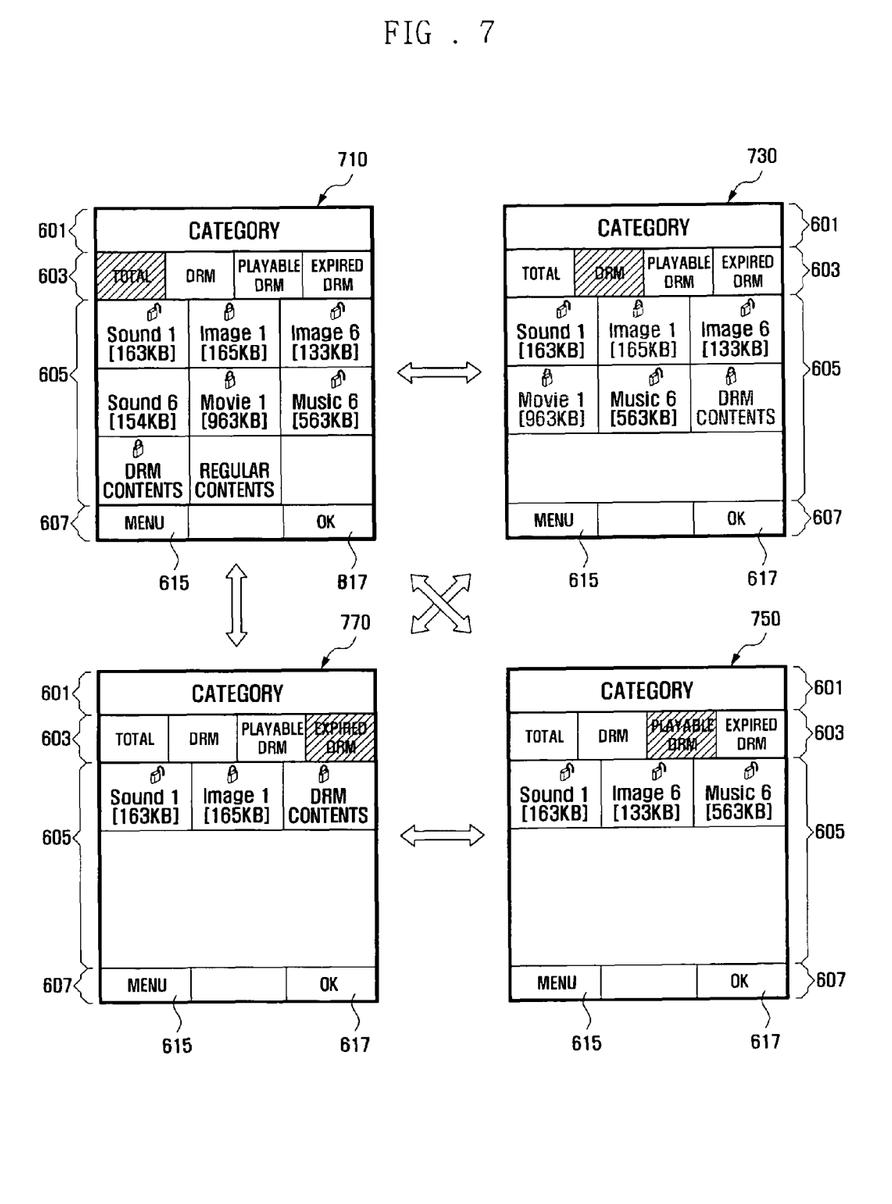
FIG. 7 illustrates representations of screens listing contents according to type.
Figure 8:
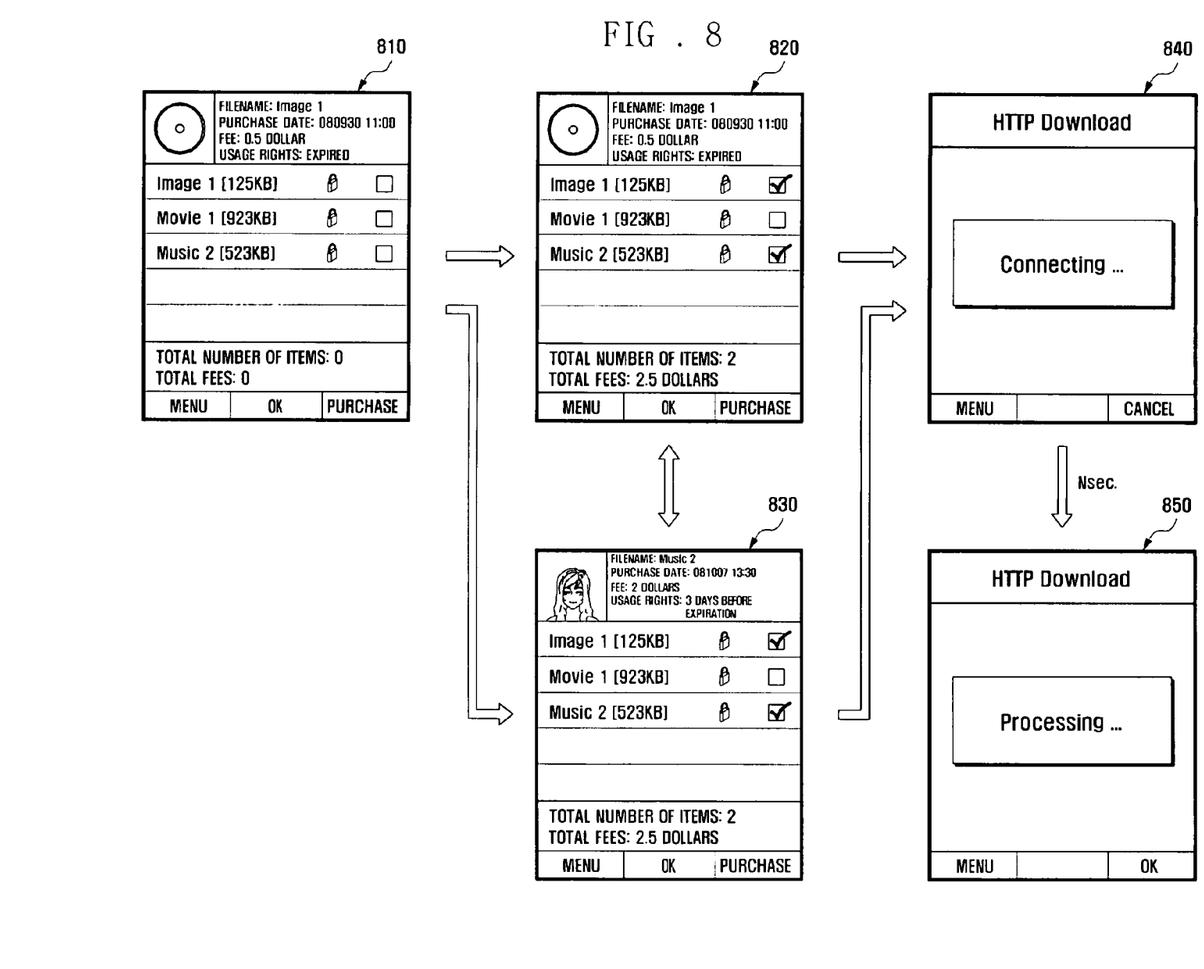
FIG. 8 illustrates screen representations for a procedure for license renewal.

FIGS. 6 through 8 illustrate a user interface in which DRM contents and regular contents can be managed separately, playable DRM contents and expired DRM contents can be managed separately, and licenses associated with expired DRM contents can be renewed. However, the present invention is not limited to these illustrations.

FIG. 6 illustrates representations of screens listing contents according to type.

As illustrated by a screen 610 in FIG. 6, the mobile terminal can display a content list of a particular category in response to a user request. On the screen 610, all contents of the content list are listed. The mobile terminal can make multiple content lists for various categories including music, movies, albums and the like.

The mobile terminal can separately display a list of DRM contents and a list of regular contents, and can separately display a list of playable DRM contents and a list of expired DRM contents, as shown in FIG. 6.

Each of the screens 610 to 670 includes a category zone 601 for indicating the category of the current content list, a grouping zone 603 for indicating the groups of contents in the content list, a listing zone 605 for listing contents in the content list, and a sub zone 607, which includes a 'menu' soft key 615 for setting content options and an 'ok' soft key 617 for selecting a desired content.

The grouping zone 603 displays group labels (total, DRM, playable DRM, expired DRM) denoting the groups of contents in the content list sorted by content type. The listing zone 605 lists regular contents and DRM contents in a distinguishable manner, and provides DRM contents with icons 209 and 211 indicating statuses of associated licenses (usable or expired). That is, the mobile terminal can list DRM contents together with icons indicating status information of licenses. Those contents listed without icons can be regular non-DRM contents. That is, icons are used to distinguish DRM contents from regular contents.

In particular, an icon in the same shape as the icon 209 indicates that the corresponding license is valid or the corresponding DRM content is playable or usable. An icon in the same shape as the icon 211 indicates that the corresponding license has expired or the corresponding DRM content is not playable. That is, the mobile terminal uses icons to distinguish playable DRM contents from expired DRM contents.

In the screen 610, all contents including regular contents and DRM contents are listed together in response to selection of the 'total' label of the grouping zone 603. Selection of the 'total' label causes all types of contents in the content list of a given category to be listed.

When the user selects one of the labels in the grouping zone 603, the mobile terminal can extract contents having a type mapped to the selected label and list the extracted contents.

When the 'DRM' label in the grouping zone 603 is selected, the mobile terminal extracts DRM contents from the content list and lists the extracted DRM contents, as illustrated by the screen 630. Selection of the 'DRM' label causes all DRM contents in the content list to be listed.

As illustrated by the screen 630, icons indicating playability of DRM contents also can be displayed. In addition, a playable DRM content and an expired DRM content can be listed differently for easy distinction. For example, expired DRM contents can be listed in a shaded form as in the case of the screen 630.

When the 'playable DRM' label in the grouping zone 603 is selected, the mobile terminal extracts playable DRM contents from the content list on the basis of their licenses and lists the extracted playable DRM contents, as illustrated by the screen 650. Selection of the 'playable DRM' label causes all playable DRM contents in the content list to be listed. As in the case of the screen 650, icons indicating playability of DRM contents also can be displayed.

When the 'expired DRM' label in the grouping zone 603 is selected, the mobile terminal extracts expired DRM contents from the content list on the basis of their licenses and lists the extracted expired DRM contents, as illustrated by the screen 670. Selection of the 'expired DRM' label causes all expired (non-playable) DRM contents in the content list to be listed. As in the case of the screen 670, icons indicating non-playability of DRM contents also can be displayed.

As described above, contents in the content list can be grouped in various ways and intuitively listed according to user selections, enabling the user to easily identify individual contents.

Although not shown in FIG. 6, the grouping zone 603 further can include a 'regular' label. When the 'regular' label in the grouping zone 603 is selected, the mobile terminal extracts regular contents from the content list and lists the extracted regular contents. Selection of the 'regular' label causes all regular non-DRM contents in the content list to be listed. In this case, icons indicating playability of DRM contents are not displayed.

Although not shown in FIG. 6, the user can select one or more contents in the content list and delete the selected contents. In particular, the user can delete some or all of the expired DRM contents.

The grouping zone 603 can be configured to include various labels according to user settings.

Although overview information regarding individual contents is provided in FIG. 6, detailed information regarding a selected content also can be provided upon request. For example, when the user selects a DRM content and requests detailed information regarding the selected DRM content, the mobile terminal can provide, through a separate window, detailed information related to the category, license (for example, the number of plays and usage duration), purchase server (for example, a URL (Uniform Resource Locator) of a web server), and the license fee.

Here, the purchase server information can be included in the DRM content header. In this case, for a given DRM content, the URL contained in the header of the DRM content can be utilized to locate a DRM server from which a license associated with the DRM content is to be acquired. As described above, a DRM content of the present invention further can include a field to store a URL of a DRM server.

FIG. 7 illustrates representations of screens listing contents according to type.

In FIG. 7, various contents in a content list are listed in a checkerboard shape. Screens in FIG. 7 correspond to the screens in FIG. 6, except for contents listed in a checkerboard shape in the listing zone 605.

That is, a screen 710 in FIG. 7 corresponds to the screen in FIG. 6, a screen 730 in FIG. 7 corresponds to the screen in FIG. 6, a screen 750 in FIG. 7 corresponds to the screen in FIG. 6, and a screen 770 in FIG. 7 corresponds to the screen 670 in FIG. 6. Hence, a more detailed description is not given for FIG. 7.

Hereinabove, embodiments are described of a user interface that can list various contents according to type. Next, a description is given of a user interface that enables license renewal for expired DRM contents. The present invention is not limited to these illustrations.

FIG. 8 illustrates screen representations for a procedure for license renewal.

As described in connection with FIGS. 3 to 5, the mobile terminal can renew the license associated with an expired DRM content during the content playback mode. In states represented by the screens 610 to 670 in FIG. 6 (or the screens 710 to 770 in FIG. 7), the mobile terminal can renew the license associated with an expired DRM content according to a user request.

The mobile terminal can also perform license renewal for multiple DRM contents substantially simultaneously. In FIG. 8, it is assumed that license renewal is performed for DRM contents "Image 1", "Movie 1" and "Music 2".

As shown by a screen 810 in FIG. 8, in response to a license renewal request for DRM contents "Image 1", "Movie 1" and "Music 2", the mobile terminal lists "Image 1", "Movie 1" and "Music 2" on the screen.

Here, the mobile terminal can place the focus or highlight on the first DRM content ("Image 1") and provide overview information on the highlighted DRM content (filename, purchase date, price, usage right and the like).

As shown by a screen 820 or screen 830, the user can select one or more of the listed DRM contents whose licenses are to be renewed.

In the screen 820 and screen 830, "Image 1" and "Music 2" of the listed DRM contents are selected by the user. In the screen 820, the focus is placed on "Image 1". In the screen 830, the focus is placed on "Music 2".

As described above, through the user interface of the present invention, the user can select one or more DRM contents whose licenses are to be renewed, and make a license renewal request for the selected DRM contents.

As illustrated in a screen 840, in response to the license renewal request, the mobile terminal attempts to access a corresponding DRM server. To access a DRM server for license renewal, the mobile terminal can use URL information contained in the DRM content header.

After connection to the DRM server, the mobile terminal downloads the license associated with the selected DRM content from the DRM server, as illustrated by a screen 850.

After license download, the mobile terminal updates the old license with the downloaded license for the selected DRM content, completing license renewal.

Hereinabove, a content management method for a mobile terminal and embodiments thereof are described. Next, a description is given of the mobile terminal that can perform functions and operations described in connection with FIGS. 1 and 8. However, the mobile terminal of the present invention is not limited to this description.

The mobile terminal of the present invention can be any information and communication appliance or multimedia appliance, such as a mobile communication terminal, portable multimedia player, MP3 player, digital broadcast receiver, personal digital assistant, or smart phone.

Figure 9:
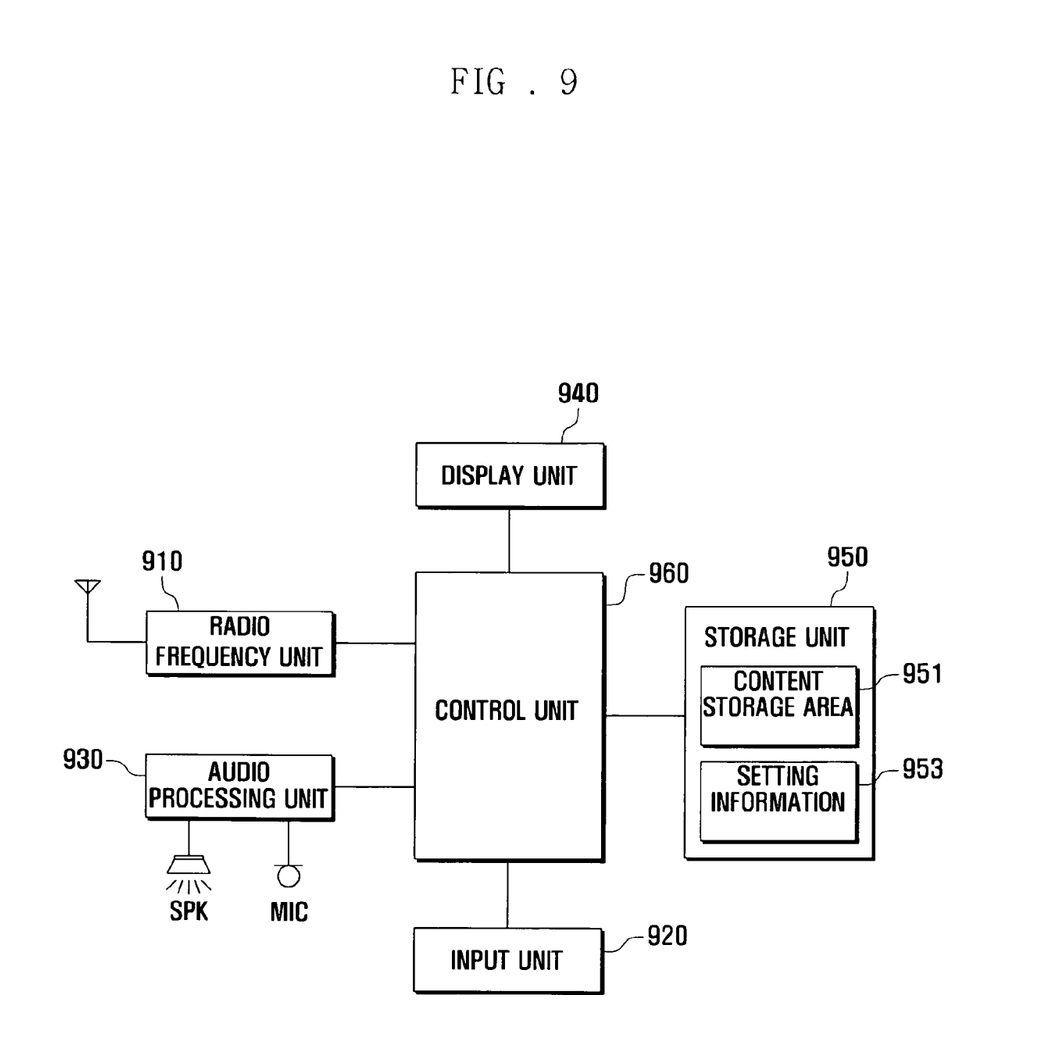
FIG. 9 illustrates a block diagram for a mobile terminal according to another exemplary embodiment of the present invention.

FIG. 9 illustrates a block diagram for a mobile terminal according to another exemplary embodiment of the present invention. In FIG. 9, a mobile communication terminal is described as an example of the mobile terminal of the present invention, however the present invention is not limited to a mobile communication terminal.

Referring to FIG. 9, the mobile terminal can include a radio frequency unit 910, input unit 920, audio processing unit 930, display unit 940, storage unit 950, and control unit 960. The storage unit 950 can include a content storage area 951 and setting information area 953.

The radio frequency unit 910 performs communication operations for the mobile terminal. The radio frequency unit 910 can establish a communication channel to a corresponding mobile communication system to perform voice and data communication. The radio frequency unit 910 can include a radio frequency transmitter for up-converting the frequency of a signal to be transmitted and amplifying the signal, and a radio frequency receiver for low-noise amplifying a received signal and down-converting the frequency of the received signal.

In particular, the radio frequency unit 910 can send and receive messages to and from external servers (content server and DRM server) to purchase a desired content and acquire the license associated with the purchased content, under the control of the control unit 960. The radio frequency unit 910 can send a license renewal request for a DRM content to the DRM server, and receive a response and the license corresponding to the request from the DRM server, under the control of the control unit 960.

The input unit 920 receives various alphanumeric information and signals for setting various functions and controlling the mobile terminal, and sends the received signals to the control unit 960. The input unit 920 can include at least one of a keypad and touch pad to generate input signals corresponding to user actions. The input unit 920 and display unit 940 can be implemented using a single touch panel (or touch screen) acting as an input means and display means simultaneously.

In particular, the input unit 920 can generate a signal for selecting at least one content of a content list displayed on the display unit 940 or generate a signal for canceling content selection, and sends the generated signal to the control unit 960. The input unit 920 can generate a signal for moving or deleting a selected content and send the generated signal to the control unit 960. The input unit 920 can generate a playback command signal for a selected content and send the generated signal to the control unit 960.

The audio processing unit 930 includes a microphone MIC and a speaker SPK. The audio processing unit 930 converts an analog voice signal from the microphone MIC into a digital signal and sends the digital signal to the control unit 960, and converts an audio signal from the control unit 960 into an audible analog signal and outputs the audible analog signal through the speaker SPK. In particular, the audio processing unit 930 can reproduce an audio signal from a regular content or DRM content according to a user selection.

The display unit 940 displays screen data generated from the operation of the mobile terminal, and state information according to key manipulations and function settings of the user. The display unit 940 displays a content list under the control of the control unit 960. The display unit 940 displays various signals and color information from the control unit 960.

In particular, the display unit 940 provides screen data of a user interface to display a content list. The display unit 940 can display various content lists such as a list of regular contents, a list of DRM contents, a list of playable DRM contents, a list of expired DRM contents and a list of total contents. The content list displayed by the display unit 940 can be selected by the control unit 960 according to display options set by the user. The display unit 940 can display screen data related to content playback mode. The display unit 940 can also display screen data related to license renewal for an expired DRM content, web browsing and downloading.

The user can easily perform license renewal for multiple expired DRM contents substantially simultaneously through the user interface. When the display unit 940 is implemented using a touch screen, the display unit 940 can also act as an input means receiving user inputs. Examples of screens displayed on the display unit 940 are illustrated in FIGS. 6 to 8.

The storage unit 950 can include a read only memory (ROM) and a random access memory (RAM). The storage unit 950 can store various data generated and utilized by the mobile terminal. That is, the storage unit 950 can store data generated from execution of an application in the mobile terminal, data generated by the use of the mobile terminal, and data received from external entities such as a content server, DRM server and personal computer. In particular, the storage unit 950 can store regular contents, DRM contents, playable DRM contents, expired DRM contents, and necessary licenses, and store screen data provided to the user and setting information for the use of the mobile terminal. The storage unit 950 also can store data used for communication through the radio frequency unit 910.

The storage unit 950 can separately store contents according to type. For example, regular contents and DRM contents can be separately stored, and playable DRM contents and expired DRM contents can be separately stored.

The storage unit 950 can store metadata regarding individual contents. When a content list is read, the storage unit 950 can provide the metadata regarding the contents in the content list. In this case, the control unit 960 can read the metadata from the storage unit 950 and control display of the contents in the content list according to display options or settings. Contents can be stored in the content storage area 951 of the storage unit 950. The content storage area 951 can be demarcated according to content type.

The setting information area 953 of the storage unit 950 can store various setting information for the operation of the mobile terminal such as options for handling expired DRM contents and license renewal. The storage unit 950 can store DRM contents, and related metadata and licenses. The metadata of a DRM content can include various information regarding the DRM content such as size, type, title, play duration, number of plays, status indicator (icon), and usage restrictions.

The storage unit 950 can store applications for controlling the operation of the mobile terminal, and applications for content management of the present invention. The applications for content management can be related to the descriptions provided for FIGS. 1 to 8. These applications can be stored in an application storage area (not shown) of the storage unit 950.

The storage unit 950 can include one or more buffers to temporarily store data generated during execution of the applications. The storage unit 950 can include an internal storage medium, external storage medium such as a smart card, and a combination of internal and external storage media.

The control unit 960 controls the overall operation of the mobile terminal, and controls signal exchange between components thereof. That is, the control unit 960 controls signal exchange between the radio frequency unit 910, input unit 920, audio processing unit 930, display unit 940, and storage unit 950.

In particular, the control unit 960 can control functions related to playback of contents in the content playback mode, and determine the option for handling expired DRM contents found during the content playback mode. According to the determined option, the control unit 960 can control an operation for deleting the expired DRM content, moving the expired DRM content to a specified folder, or renewing the license of the expired DRM content. For license renewal of expired DRM contents, the control unit 960 can select one of the single renewal option and collective renewal option, and control a license renewal operation according to the selection option.

When the license of an expired DRM content is renewed, the control unit 960 can update the status indicator (icon) of the renewed DRM content, and move the renewed DRM content to a pre-specified folder.

In response to a request for listing contents, the control unit 960 extracts those contents satisfying a preset or requested display option, and provides a list of the extracted contents. For DRM contents, the control unit 960 provides status indicators on the basis of licenses.

The control unit 960 controls a series of operations to display a menu screen for displaying a content list, display status information for one or more DRM contents selected from the content list, and display license renewal information for DRM contents. For listing contents, the control unit 960 controls a display operation to display one of a mixed list of regular contents and DRM contents, a list of regular contents, a list of DRM contents, a list of playable DRM contents, and a list of expired DRM contents, according to the user settings.

The control unit 960 can control the operations and functions described in connection with FIGS. 1 to 8. The operation of the control unit 960 can be implemented through software.

The control unit 960 can include a baseband module. The baseband module transforms a signal to be transmitted through channel coding, interleaving and modulation, and sends the transformed signal to the radio frequency unit 910, and transforms a received signal from the radio frequency unit 910 through demodulation, equalization, channel decoding and de-interleaving. The baseband module can be included in the radio frequency unit 910. The baseband module can be an entity separate from the control unit 960 and radio frequency unit 910.

The configuration of the mobile terminal of the present invention is not limited to FIG. 9, and the mobile terminal further can include any of a digital broadcast receiving module, short-range communication module, camera module, and Internet communication module. It should be apparent to those skilled in the art that one of the above-mentioned components of the mobile terminal can be excluded or replaced with another component.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A content management method for a mobile terminal, the method comprising:
   identifying, by the mobile terminal, when a content is selected in a content list, whether the content is an expired Digital Rights Management (DRM) content that is not playable due to license expiration;
   determining, when the content is the expired DRM content, a setting for handling expired DRM contents; and
   automatically performing, according to the determined setting, one of:
      deleting the expired DRM content,
      moving the expired DRM content to a pre-specified folder, and
      renewing a license associated with the expired DRM content.

2. The content management method of claim 1, wherein identifying the expired DRM content comprises:
   identifying, when a DRM content is found during the content playback mode, the license associated with the found DRM content; and
   regarding, when the license has expired, the found DRM content as the expired DRM content.

3. The content management method of claim 2, wherein performing one of the deleting, the moving or the renewing comprises:
   deleting, when the setting is for deletion, the expired DRM content and playing back a next content in the content list; and
   deleting, according to settings, all remaining expired DRM contents from the content list simultaneously.

4. The content management method of claim 2, wherein performing one of the deleting, the moving or the renewing comprises:
   moving, when the setting is for movement, the expired DRM content to a pre-specified folder and playing back a next content in the content list; and
   moving, according to settings, all remaining expired DRM contents in the content list to the pre-specified folder substantially simultaneously.

5. The content management method of claim 2, wherein performing one of the deleting, the moving or the renewing comprises:
   transitioning to, when the setting is for renewal, a license renewal mode;
   determining a renewal option during the license renewal mode;

renewing, when the determined renewal option is single renewal, a license associated with the expired DRM content; and renewing, when the determined renewal option is collective renewal, individual licenses associated with all expired DRM contents in the content list.

6. The content management method of claim 5, wherein performing one of the deleting, the moving or the renewing further comprises:

transitioning back to the content playback mode after license renewal; and playing back, according to settings during the content playback mode, the license-renewed DRM content (having been found as the first expired DRM content) or a next content in the content list.

7. The content management method of claim 2, wherein when the content list is displayed, each DRM content is listed together with an icon indicating a status of a license associated with the DRM content.

8. The content management method of claim 7, wherein an icon for an expired DRM content is different from that for a playable DRM content, and wherein contents in the content list being displayed are represented as one of a list of total contents, a list of DRM contents, a list of playable DRM contents, and a list of expired DRM contents.

9. The content management method of claim 5, wherein renewing a license associated with the expired DRM content comprises:

connecting to, using uniform resource locator (URL) information of a DRM server contained in the header of the expired DRM content, the DRM server;

downloading a license associated with the expired DRM content;

updating an old license associated with the expired DRM content on the basis of the downloaded license; and moving the license-renewed DRM content to a pre-specified folder.

10. A mobile terminal comprising:

a storage unit configured to separately store various contents according to their types including regular contents, Digital Rights Management (DRM) contents, playable DRM contents and expired DRM contents, store licenses associated with DRM contents, and store settings for handling expired DRM contents and license renewal; and a control unit configured to:

identify, when a content is selected in a content list, whether the content is an expired DRM content;

determine, when the content is the expired DRM content, a setting for handling expired DRM contents; and automatically perform, according to the setting, one of: deleting the expired DRM content, moving the expired DRM content to a pre-specified folder, or renewing the license associated with the expired DRM content.

11. The mobile terminal of claim 10, wherein the storage unit is configured to store metadata regarding individual contents; and provide, when a content list is read, the metadata regarding contents in the content list.

12. The mobile terminal of claim 11, wherein the control unit is configured to identify, when a DRM content of a content list is found during the content playback mode, a license associated with the found DRM content; regard, when the license has expired, the found DRM content as an expired DRM content; and determine the setting for expired DRM contents.

13. The mobile terminal of claim 12, wherein:

the control unit is configured to delete, when the setting is for deletion, the expired DRM content, play back the next content in the content list, and delete, according to settings, all remaining expired DRM contents from the content list substantially simultaneously, and the control unit is configured to move, when the setting is for movement, the expired DRM content to a pre-specified folder; play back the next content in the content list; and move, according to settings, all remaining expired DRM contents in the content list to the pre-specified folder substantially simultaneously.

14. The mobile terminal of claim 12, wherein the control unit is configured to transition to, when the setting is for renewal, a license renewal mode; determine a renewal option during the license renewal mode; renew, when the determined renewal option is single renewal, a license associated with the expired DRM content; and renew, when the determined renewal option is collective renewal, individual licenses associated with all expired DRM contents in the content list.

15. The mobile terminal of claim 14, wherein the control unit is configured to transition back to the content playback mode after license renewal; and play back, according to settings during the content playback mode, the license-renewed DRM content (having been found as the first expired DRM content) or a next content in the content list.

16. The mobile terminal of claim 14, wherein the control unit is configured to connect to, using uniform resource locator (URL) information of a DRM server contained in the header of the expired DRM content, the DRM server; download a license associated with the expired DRM content; and update the old license associated with the expired DRM content with the downloaded license.

17. The mobile terminal of claim 16, wherein the control unit is configured to update, after license renewal, status information of the expired DRM content; and move the license-renewed DRM content to a pre-specified folder.

18. The mobile terminal of claim 12, wherein the control unit is configured to list, when the content list is displayed, each DRM content of the content list together with an icon indicating a status of a license associated with the DRM content in a manner that an icon for an expired DRM content is different from that for a playable DRM content.

19. The mobile terminal of claim 18, wherein the control unit is configured to list contents of the content list in a form of a list of total contents, a list of DRM contents, a list of playable DRM contents, or a list of expired DRM contents according to selection of a menu item.

20. The mobile terminal of claim 10, further comprising a display unit configured to display a content playback window during the content playback mode, and separately display contents of a content list according to their types including regular contents, DRM contents, playable DRM contents, expired DRM contents, and total contents.

21. The content management method of claim 4, wherein when the content list is displayed, each DRM content is listed together with an icon indicating a status of a license associated with the DRM content, wherein an icon for an expired DRM content is different from that for a playable DRM content, and wherein contents in the content list being displayed are represented as one of a list of total contents, a list of DRM contents, a list of playable DRM contents, and a list of expired DRM contents.

* * * * *